US011472587B2

(12) United States Patent
Voelker

(10) Patent No.: US 11,472,587 B2
(45) Date of Patent: Oct. 18, 2022

(54) APPARATUS AND METHOD FOR PROVIDING INDIVIDUAL PRODUCTS OF MORE THAN ONE ORDER AT A PACKING STATION IN AN ORDER-RELATED MANNER

(71) Applicant: Dürkopp Fördertechnik GmbH, Bielefeld (DE)

(72) Inventor: Sigurd Voelker, Vlotho (DE)

(73) Assignee: Dürkopp Fördertechnik GmbH, Bielefeld (DE)

(*) Notice: Subject to any disclaimer, the term of this patent is extended or adjusted under 35 U.S.C. 154(b) by 550 days.

(21) Appl. No.: 16/434,908

(22) Filed: Jun. 7, 2019

(65) Prior Publication Data

US 2019/0375527 A1 Dec. 12, 2019

(30) Foreign Application Priority Data

Jun. 11, 2018 (DE) ..................... 10 2018 209 266.4

(51) Int. Cl.

*B65B 35/44* (2006.01)
*B65B 5/06* (2006.01)
*B65B 65/00* (2006.01)
*B65G 17/20* (2006.01)

(52) U.S. Cl.

CPC ................ *B65B 35/44* (2013.01); *B65B 5/06* (2013.01); *B65B 65/003* (2013.01); *B65G 17/20* (2013.01)

(58) Field of Classification Search

CPC ......... B65B 35/44; B65B 5/06; B65B 65/003; B65G 1/137; B65G 1/1376; B65G 1/1378; B65G 1/0457; B65G 47/61; B65G 17/20; B65G 17/485; B65G 9/00; B07C 3/082; B07C 3/02; B07C 3/00; B07C 5/36

USPC ........................................................... 53/443

See application file for complete search history.

(56) References Cited

U.S. PATENT DOCUMENTS 4,133,098 A * 1/1979 Brook ....................... B07C 5/36 198/569
4,274,783 A 6/1981 Eineichner et al.
4,815,582 A * 3/1989 Canziani .............. B65G 17/345 104/119
5,190,135 A * 3/1993 Solund .................... B07C 3/082 198/370.05

(Continued)

FOREIGN PATENT DOCUMENTS

DE 4209558 A1 9/1993
DE 298 06 960 U1 8/1998

(Continued)

*Primary Examiner* — Dariush Seif
(74) *Attorney, Agent, or Firm* — McGlew and Tuttle, P.C.

(57) ABSTRACT

An apparatus serves to provide individual products of a plurality of orders at a packing station of an overhead conveyor installation in an order-related manner. The apparatus has a conveyor track with a conveyor system for conveying the individual products in a suspended manner, an unloading station for unloading the individual products, a feed opening for feeding the individual products, and a discharge opening connected to said feed opening in a conveying manner, the discharge opening being configured to provide individual products of a first order at the packing station, and a parking area for parking individual products of a second order at the packing station.

14 Claims, 4 Drawing Sheets

(56) References Cited

U.S. PATENT DOCUMENTS

| | | | | |
|---|---|---|---|---|
| 6,208,908 | B1 * | 3/2001 | Boyd | G06Q 10/087 700/216 |
| 7,809,467 | B2 | 10/2010 | Schaefer | |
| 8,037,994 | B2 * | 10/2011 | Schaefer | B65G 1/133 198/456 |
| 8,839,945 | B2 * | 9/2014 | Gruber | B65G 1/1378 198/370.06 |
| 9,108,224 | B2 * | 8/2015 | Schererz | B07C 3/00 |
| 9,174,246 | B2 | 11/2015 | Berdelle-Hilge | |
| 9,212,013 | B2 | 12/2015 | Fankhauser et al. | |
| 10,427,873 | B1 * | 10/2019 | Mause | B65G 1/1376 |
| 2002/0087231 | A1 * | 7/2002 | Lewis | B65G 1/1373 700/230 |
| 2005/0076617 | A1 * | 4/2005 | Hellmann | B65G 65/489 53/445 |
| 2006/0229762 | A1 * | 10/2006 | Schaefer | B65G 1/1378 700/216 |
| 2009/0299521 | A1 * | 12/2009 | Hansl | B65G 1/1378 700/215 |
| 2014/0086713 | A1 * | 3/2014 | Fankhauser | B65G 9/004 414/222.01 |
| 2014/0284254 | A1 * | 9/2014 | Berdelle-Hilge | B07C 3/02 209/552 |
| 2015/0232284 | A1 * | 8/2015 | Sieksmeier | B65G 47/61 198/367 |
| 2016/0096643 | A1 * | 4/2016 | Baylor | B65B 5/105 53/443 |
| 2018/0025410 | A1 * | 1/2018 | Kasper | G06Q 10/0875 700/216 |
| 2018/0154399 | A1 * | 6/2018 | Wagner | B07C 5/362 |
| 2018/0208407 | A1 * | 7/2018 | Ruge | B65G 9/004 |
| 2018/0339859 | A1 * | 11/2018 | Sigrist | B65G 19/025 |
| 2018/0345324 | A1 * | 12/2018 | Hillerich, Jr. | B25J 19/023 |
| 2020/0024074 | A1 * | 1/2020 | Herzog-Lang | B65G 9/002 |
| 2020/0189846 | A1 * | 6/2020 | Sutter | B65G 47/905 |

FOREIGN PATENT DOCUMENTS

| | | | |
|---|---|---|---|
| DE | 202005002292 | U1 | 5/2005 |
| DE | 10 2004 014378 | A1 | 10/2005 |
| DE | 102007011856 | B4 | 1/2011 |
| DE | 10 2011 015138 | A1 | 9/2012 |
| DE | 102012101198 | A1 | 4/2013 |
| DE | 102011087370 | A1 | 5/2013 |
| DE | 102012018925 | A1 | 3/2014 |
| DE | 202017100206 | U1 | 4/2018 |
| JP | 2000 177835 | A | 6/2000 |
| WO | 9806645 | A1 | 2/1998 |
| WO | 2006/029212 | A2 | 3/2006 |
| WO | 2009/121090 | A2 | 10/2009 |
| WO | 2012024714 | A2 | 3/2012 |

* cited by examiner 1
2
3
4
5
6
7
8
9
10
11
12
13
14
15
16
17
35

APPARATUS AND METHOD FOR PROVIDING INDIVIDUAL PRODUCTS OF MORE THAN ONE ORDER AT A PACKING STATION IN AN ORDER-RELATED MANNER

CROSS-REFERENCE TO RELATED APPLICATIONS

This application claims the priority of German Patent Application, Serial No. 10 2018 209 266.4, filed on Jun. 11, 2018, pursuant to 35 U.S.C. 119(a)-(d), the content of which is incorporated herein by reference in its entirety as if fully set forth herein.

FIELD OF THE INVENTION

The invention relates to an apparatus and a method for providing individual products of more than one order at a packing station of an overhead conveyor installation in an order-related manner.

BACKGROUND OF THE INVENTION

Individual products from an incoming goods department and/or a warehouse can be transported separately in a conveyor system using transport bags. The transport bags loaded with individual products are transported to a packing station where they are unloaded from the transport bags and collected for packing. As soon as all individual products of an order have arrived at the packing station, the order can be packed and shipped. In order prevent individual products of different orders from getting mixed up, individual products of a following order are not unloaded at the packing station until the previous order has been fully completed. The packing station is blocked during this waiting time. Conveying individual products in a system of this type is not flexible. The feed rate is reduced. The feed rate of the overheat conveyor system in particular depends on the processing speed at the packing station, which is in particular performed manually.

SUMMARY OF THE INVENTION

It is the object of the present invention to provide a more flexible and efficient transport of individual products, in particular in an overhead conveyor installation.

According to the invention, this object is achieved by an apparatus for providing individual products of a plurality of orders at a packing station of an overhead conveyor installation in an order-related manner, the apparatus having a conveyor system for conveying the individual products in a suspended manner, an unloading station for unloading the individual products, a conveyor track with a feed opening for feeding the individual products unloaded at the unloading station, a discharge opening connected to said feed opening in a conveying manner, the discharge opening being configured to provide individual products of a first order at the packing station, and a parking area for parking individual products of a second order at the packing station.

In another aspect of the invention, this object is achieved by an overhead conveyor installation with an apparatus according to the invention, and a packing station for packing the individual products provided in an order-related manner by means of the apparatus.

In yet another aspect of the invention, this object is achieved by a method for providing individual products of a plurality of orders at a packing station of an overhead conveyor installation in an order-related manner, the method comprising the method steps of conveying the individual products to an unloading station in a suspended manner by means of a conveyor system, unloading the individual products at the unloading station, feeding the individual products unloaded at the loading station to a conveyor track via a feed opening, conveying the individual products along the conveyor track, providing individual products of a first order at a discharge opening of the packing station, packing the individual products of the first order at the packing station, removing the packed first order from the packing station, parking individual products of a second order in a parking area, and providing the individual products of the second order at the packing station after removing the packed first order.

According to the invention, it was found that a parking area provided at a packing station of a conveyor installation, in particular an overhead conveyor installation, for parking individual products of an order allows for more flexibility. Individual products, which are transported to the packing station in the overhead conveyor installation, can be loaded into a conveyor track of an apparatus. The apparatus can also comprise a plurality of conveyor tracks. The apparatus can be used in e-commerce for packing goods for shipping. An e-commerce order typically comprises three to four individual products. The apparatus is also capable of processing orders consisting of a plurality of individual products. An order consisting of a plurality of individual products, in particular more than 10 individual products, in particular more than 100 individual products, in particular more than 1,000 individual products, and in particular more than 10.000 individual products, can be distributed to a plurality of conveyor tracks of the apparatus to ensure that the individual products are provided at the packing station in an efficient manner. The individual products are fed to the conveyor track via a feed opening, and are then conveyed to a discharge opening connected thereto in a conveying manner. The individual products are provided at the discharge opening in an order-related manner. The parking area allows the individual products of a following order to be buffered as long as the individual products of a previous order have not been processed at the packing station. The conveyor track is in particular configured as a conveyor shaft, a conveyor chute, a spiral chute and/or a conveyor belt. The feed opening of an in particular closed conveyor shaft is understood to be the end of the conveyor shaft where the individual products are loaded into the conveyor shaft. Correspondingly, the discharge opening is the opening of the closed shaft where the individual products can be removed. In the case of an in particular open conveyor chute or spiral chute or in the case of a conveyor belt, the feed opening and the discharge opening are understood to be those points where the individual products are loaded onto or removed, respectively, from the respective conveyor track. In other words, the feed opening is the upstream end of the conveyor belt, for example, while the discharge opening is the downstream end of the conveyor belt. It is not important how the products are being transported from the feed opening to the discharge opening. They can be transported in an automatic manner, in particular due to gravity. They can also be transported by means of a driven conveying means. The conveyor track defines a conveying direction, which is oriented from the feed opening to the discharge opening.

The apparatus has a conveyor apparatus which allows individual products to be transported in a suspended manner, in particular in a respective transport bag each. At an unloading station, the individual products can be unloaded from the transport bags in particular automatically. At the unloading station, the transport bags are opened in particular automatically, causing the individual products to fall out of the transport bags due to gravity.

The individual products can be loaded into the conveyor track automatically through the feed opening. At the packing station, the individual products are packed to order and are then shipped. It is in particular conceivable for the transport bags to be unloaded at the unloading station while the transport bags are being transported along a transport direction. To this end, it is in particular possible to define an unloading station corridor in the unloading station in which said automatic unloading of the transport bags takes place. The length of the unloading corridor depends in particular on the transport speed of the transport bags and/or on the size of the feed openings.

It is particularly advantageous if the individual products of an order are fed to the apparatus in a presorted, in particular order-related, manner, in other words they are loaded into the conveyor track in a presorted manner. It is particularly advantageous to reduce the time interval between the first individual product of an order arriving at the packing station and the last individual product of this order arriving at the packing station. This reduces the time interval during which the conveyor track is filled with the individual products of the order and is therefore blocked for following orders. The overall utilization of the apparatus is enhanced. According to the invention, the apparatus is also capable of performing a so-called destination sorting by sorting the individual products, which are loaded into the apparatus in an unsorted manner, by means of the apparatus and assigning them to the various discharge openings in an order-related manner. The apparatus allows individual products to be buffered at the packing station. The apparatus in particular also allows the individual products to be sorted according to order.

An apparatus configured such that the parking area is arranged in a second conveyor track, which is provided with a second feed opening for feeding the individual products of the second order and with a second discharge opening connected to the second feed opening in a conveying manner, for providing the individual products of the second order at the packing station simplifies the separate loading of individual products of different orders. The apparatus comprises at least two conveyor tracks. The number of conveyor tracks and their assignment to the packing stations can be configured variably. The individual products of a first order are loaded into a first conveyor track while the individual products of a second order are loaded into a second conveyor track. The first and the second conveyor track are physically separated from one another and are in particular configured as separate conveyor shafts, conveyor chutes, spiral chutes and/or conveyor belts. This allows individual products of the second order to be loaded into the second conveyor track while the individual products of the first order are still being loaded into the first conveyor track and/or are still being processed at the packing station. In particular, it is not necessary for the individual products to be transported to the apparatus according to order, in other words in a sorted manner. A so-called destination sorting can be performed at the apparatus, which thus forms a destination.

A signal member configured to indicate that the individual products of a complete order are available at the discharge opening indicates to an operator, in particular at the packing station, the discharge opening where the individual products of a complete order are available. The operator is then able to process this order next. It is in particular conceivable to use a control unit, which is in particular in signal communication with the signal member, in particular bidirectionally, to indicate to the operator which order needs to be processed, in other words packed, next. The signal member provides an optical, acoustic and/or any other signal to allow technologies such as pick-by-light, pick-by-voice and/or pick-by-vision to be implemented at the packing station.

In addition or as an alternative to the signal member, a retaining member can be provided to prevent the operator from removing individual products of an order from the discharge opening in an unauthorized manner. The retaining member is for example a mechanical separating device, which can in particular be configured as a flap, a basket or a spacer, which cannot be opened manually by the operator. The retaining member prevents orders from being processed, which are not yet intended for processing or cannot be processed yet because they are incomplete, have a low priority and/or are to be shipped at a later date, for example. A configuration of this type is necessary in particular when transporting individual products, which require a high process safety, such as pharmaceutical products.

An apparatus configured such that a separating member is arranged along the conveyor track to separate the individual products of various orders allows the conveyor track and the parking area to be designed in a compact manner. The parking area can be integrated into the conveyor track using a separating member. The separating member is in particular a mechanical separating member configured in particular as a pivotable flap or a slider. The separating member can be used to at least temporarily interrupt the connection between the feed opening and the discharge opening along the conveying direction. Therefore, it is possible to load individual products of a following order into the conveyor track while the individual products of the previous order are still being processed at the discharge opening. Owing to the separating member, which is provided to prevent the individual products of the following order from being transported to the discharge opening, the individual products of various orders are reliably prevented from getting mixed up.

The separating member can also be configured as a switch flap. In a configuration of this type, the conveyor track has in particular one feed opening and two discharge openings, with the individual products of the first order being collected at the first discharge opening while the individual products of the second order are collected at the second discharge opening. A conveyor track of this type is particularly uncomplicated if the individual products are already sorted to order when being loaded into the conveyor track. In this case, all individual products of the first order are fed to the first discharge opening, then the switch blade is operated, thus allowing the individual products to be fed to the second discharge opening. Additionally it is generally conceivable to provide a bidirectional signal communication for the switch blade by means of a control unit to change the operating position of the switch blade in response to the individual product fed to the feed opening in such a way that the individual products are sorted in the conveyor track according to the first and second order.

A plurality of conveyor tracks each having in particular one feed opening and one discharge opening, the feed openings and/or the discharge openings being arranged in the manner of a matrix, in particular in rows and columns, provide a particularly high flexibility when handling and sorting the individual products as well as a high product throughput rate when conveying products. The conveyor tracks have a buffer function to compensate for variations in the number of available and packed orders. The buffer function is particularly advantageous if the number of occupied and free conveyor tracks is monitored and reported to the operator of the plant.

Based on this information, the operator of the plant is then able to add or withdraw operating personnel.

A compact arrangement of the feed openings and discharge openings allows the individual products to be unloaded from the transport bags and the individual products to be packed into orders in a space-saving manner.

A stop member arranged at the discharge opening to stop the feeding of the individual products ensures that the individual products are provided at the discharge opening in a defined manner. The stop member can be a pivotable flap or a slider at the discharge opening, which is opened when the individual products are ready for packing. The stop member can also be opened in an automated manner. The stop member can also be a retaining bar, which prevents the individual products from being transported any further in an uncontrolled manner in particular at the end of an inclined chute or an inclined shaft.

The stop member can be used in particular in addition or as an alternative to the retaining member.

Inclined embodiments of the feed opening, which is arranged at a feed inclination angle of at most 45°, in particular at most 30°, in particular at most 15°, and in particular at most 5° in relation to a horizontal plane, and is in particular oriented horizontally, and/or of the discharge opening, which is arranged at a discharge inclination angle of at most 45°, in particular at most 30°, in particular at most 15°, and in particular at most 5° in relation to a vertical plane, and is in particular oriented vertically, simplify the automated feeding of the individual products into the conveyor track and the automated removal thereof from the conveyor track.

An embodiment of the conveyor track configured such that the conveyor track is inclined in relation to the horizontal at least partly allows the individual products to be conveyed along the conveyor track in a particularly simple manner. It is in particular conceivable to provide an automatic transport due to gravity.

A sensor provided to detect the individual products loaded into the conveyor track allows the apparatus to be operated flexibly. The sensor is in particular able to detect when an individual product is being dropped from a transport bag of the overhead conveyor installation into the conveyor track of the apparatus. Along the overhead conveyor installation and the apparatus, further sensors can be arranged to detect the respective position of the transport bag. Combining the known identity and the position of the transport bag with the confirmation, provided by the sensor, that an individual product has been dropped into the conveyor track is sufficient to recognize whether an order in the conveyor track is complete.

The sensor can also be used to indicate to the control unit whether the conveyor track associated thereto is empty or already occupied by individual products of an order. To this end, additional sensors can be arranged along the conveyor track, in particular also in the region of the discharge opening. In particular, this helps to prevent an operator at the packing station from removing an incomplete number of individual products of an order. If, for example, the operator releases the conveyor track after removing the individual products but the sensor detects that individual products are still available at the discharge opening, a corresponding error signal can be provided. An unambiguous identification of the individual product is not necessary so the sensor can have a particularly simple design. It is sufficient if the sensor is able to detect whether at least one individual product is arranged at the discharge opening. An in particular bidirectional signal communication is provided between the sensor and a control unit. It is possible to monitor and influence the flow of individual products along the overhead conveyor installation and in the apparatus, in other words to move individual products to a particular conveyor track in a targeted manner.

An overhead conveyor installation comprising an apparatus of this type has essentially the same advantages as the apparatus itself to which reference is herewith made.

A method for providing individual products of a plurality of orders at a packing station of an overhead conveyor installation in an order-related manner, the method comprising the method steps of conveying the individual products to an unloading station in a suspended manner by means of a conveyor system, unloading the individual products at the unloading station, feeding the individual products unloaded at the loading station to a conveyor track via a feed opening, conveying the individual products along the conveyor track, providing individual products of a first order at a discharge opening of the packing station, packing the individual products of the first order at the packing station, removing the packed first order from the packing station, parking individual products of a second order in a parking area, and providing the individual products of the second order at the packing station after removing the packed first order has essentially the same advantages as the apparatus itself to which reference is herewith made. Owing to the fact that individual products of a following order, in other words a second order, can be parked, in other words stored temporarily, in a parking area while the individual products of the previous order are still being packed, the flexibility when conveying individual products is enhanced while the risk of mixing up individual products of various orders at the packing station is prevented. It is in particular conceivable to pack orders of a higher priority first even if other orders have arrived at the packing station before. Said prioritization of orders is in particular independent of the sequence of the individual products or of the transport bags. An embodiment of this type is particularly advantageous for large packing areas with a large number of conveyor tracks.

A method configured such that the individual products are fed to the feed opening in an order-related manner allows for a more simple design of the apparatus. Owing to the fact that the individual products are fed according to order, a sorting process in the apparatus can be omitted.

A sorting unit provided in the overhead conveyor installation to perform an order-related presorting simplifies the order-related feeding of the individual products to the apparatus.

In a preferred embodiment of the method, a sorting of the individual products is carried out by a targeted loading of the individual products into different conveyor tracks, thus resulting in a targeted discharge of the individual products, which permits a so-called destination sorting. The functional density of the apparatus is increased. The method has an enhanced flexibility.

Both the features set out in the patent claims and the features set out in the following exemplary embodiments of an inventive apparatus are suitable, both on their own and taken in combination with each other, to refine the inventive subject matter. The respective combinations of features are not to be construed as limiting the subject matter of the invention to the refinements disclosed therein but are included only to serve as examples.

Further features, advantages and details of the invention will be apparent from the ensuing description of exemplary embodiments, taken in conjunction with the drawing.

DESCRIPTION OF THE PREFERRED EMBODIMENTS

Figure 1:
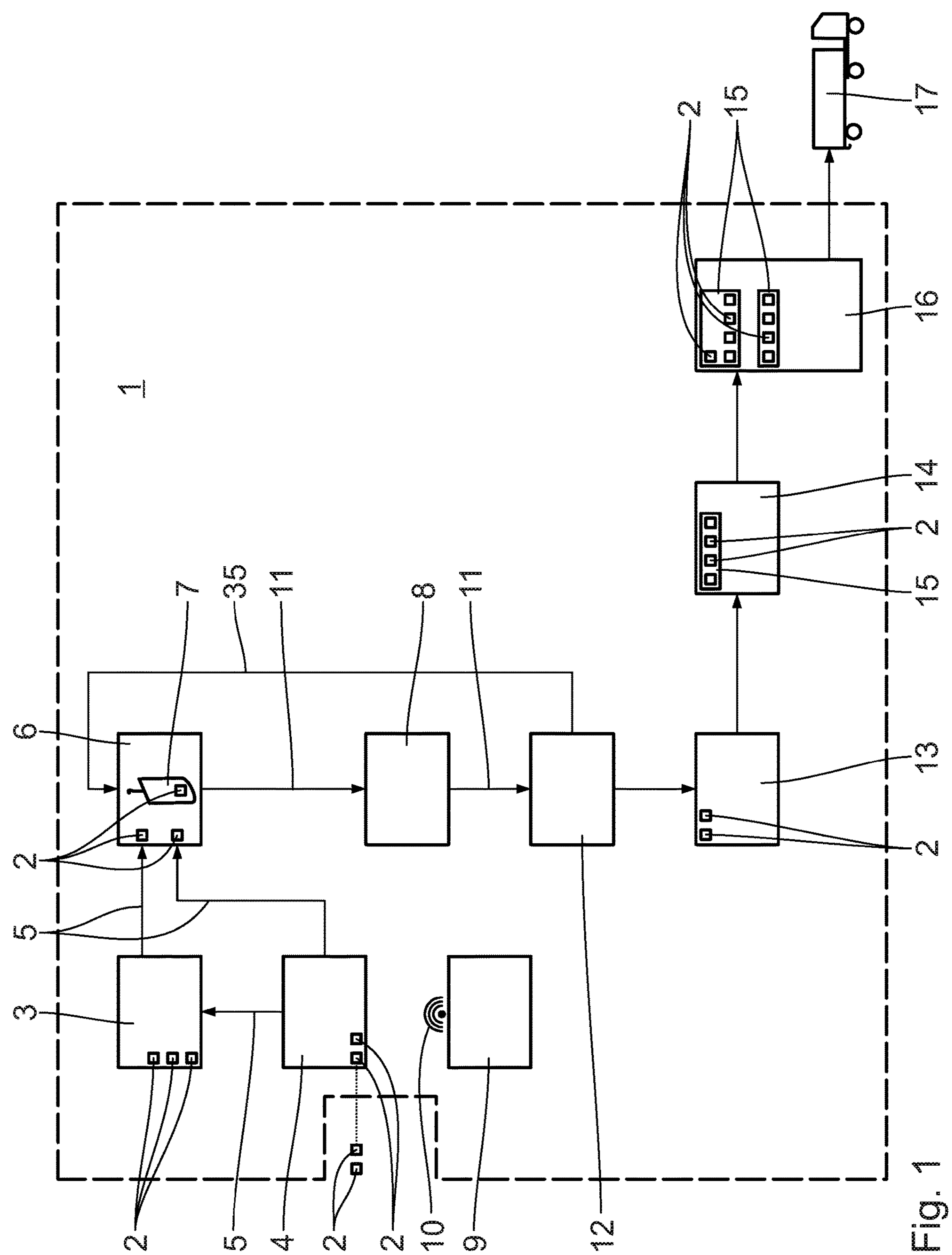
FIG. 1 shows a schematic view of an overhead conveyor installation.

An installation, designated as a whole by reference numeral 1 in FIG. 1, is used for conveying and/or transporting individual products 2. The installation 1 comprises a warehouse 3 in which the individual products 2 are stored. The warehouse 3 can be configured as a manual warehouse or as an automatic warehouse. The installation 1 further has an incoming goods department 4 via which individual products are supplied to the installation 1, in particular form outside. Returned goods can also be supplied to the incoming goods department 4.

The incoming goods department 4 is connected to the warehouse 3 by means of a conveyor system 5. The conveyor system 5 is for example a conveyor belt or a manual feeding of the individual products 2 to the warehouse 3, it in particular being possible for the products to be provided to the incoming goods department 4 in the form of bundles.

The installation 1 further comprises a loading station 6 where the individual products are loaded into a carrying device 7 configured as a transport bag. By means of a conveyor system 5, the loading station 6 is connected both to the incoming goods department 4 and to the warehouse 3 separately. By means of the conveyor system 5, the individual products 2 are conveyor from the warehouse 3 and/or the incoming goods department 4 to the loading station.

An installation 1 without conveyor system between the loading station 6 and the incoming goods department 4 and/or the warehouse 3 is also conceivable. In this case, the individual products 2 are transported from the incoming goods department 4 and/or the warehouse 3 to the loading station 6 manually, in particular using spring loaded trolleys or pallet lifting trucks.

The carrying devices 7 can each be transported separately along a rail system by means of a roll adapter. The carrying devices 7 are transported in a suspended manner. The installation 1 is an overhead conveyor installation.

It is advantageous if the carrying devices 7 are each adapted to be identified unambiguously by means of an identification device. To this end, the roll adapters can each be provided with an integrated RFID chip on which identification data are stored. The identification data can be detected using suitable reading devices, which are in particular arranged along the transport path of the overhead conveyor installation 1, to track and control the transport position of the carrying devices 7 along the overhead conveyor installation.

In order to allow the carrying devices 7 to be conveyed through the overhead conveyor installation 1 in a suspended manner, the carrying devices 7 are each connected to a roll adapter in a positive-locking manner. In particular, the carrying devices 7 each have a hook, which is adapted to engage a corresponding recess of the roll adapter. The recess of the roll adapter is also adapted to accommodate a clothes hanger with a piece of clothing hanging thereon. In particular, each carrying device 7 serves for transporting precisely one individual product 2.

Details of the roll adapter, its transportation along a rail system and the overhead transportation of a carrying device configured as a transport bag are described in EP 1 690 811 B1 to which reference is made explicitly. Alternatively, the roll adapter can also be configured in the shape of a hook, which is adapted to engage a recess of the carrying device 7.

The overhead conveyor installation 1 comprises a sorting unit 8, which is used to sort the carrying devices 7, in other words to change the sequence of the individual products in the product flow. The sorting unit 8 can be configured in different ways. The sorting unit 8 may have a plurality of accumulation zones arranged in parallel and/or in series and/or it may have one or a plurality of carousels. The sorting unit 8 may additionally or alternatively be configured as a matrix sorter.

The sorting unit 8 is used in particular to compile the individual products 2 into logical groups. In particular, the individual products 2 are compiled in groups of individual products 2 forming an order 15. The sorting unit 8 also allows groups of individual products 2 to be formed, which are part of an order 15.

The overhead conveyor installation 1 comprises a central control unit 9, which is in signal connection in particular with the reading devices along the overhead conveyor installation 1. The signal connection can be wired or wireless. A wireless radio signal connection is shown in FIG. 1 by a symbol 10 for radio transmission.

The overhead conveyor installation 1 comprises a rail system 11 by means of which the carrying devices 7 are conveyed from the loading station 6 to the sorting unit 8 and through the sorting unit 8. The rail system 11 is also used to connect the sorting unit 8 to at least one unloading station 12 in a conveying manner.

In particular, a plurality of unloading stations 12 are provided. At the loading station 12, the carrying devices 7 are opened and unloaded automatically, in particular due to gravity, which causes the individual product 2 to fall out of the opened carrying device 7 in a downward direction. An opening unit, which is not shown in more detail, is provided to open the carrying devices 7 automatically in the unloading station 12.

Having been unloaded at the loading station 12, the individual products 2 are delivered to an apparatus, which is designated as a whole by reference numeral 13, configured to provide the individual products 2 of a plurality of orders in an order-related manner. The apparatus 13 is arranged adjacent to the unloading station 12 and to a packing area with at least one packing station 14. In particular, the apparatus 13 serves to convey and move the individual products 2 from the loading station 12 to the packing station 14.

At least one of the loading stations 12 is permanently assigned to the packing area. The packing area has at least one packing station 14. In particular, a plurality of packing stations 14 are provided in the packing area. The number of unloading stations 12 per packing area 14 is at least one. It is conceivable as well for a plurality of unloading stations 12 to be assigned to one packing station 14.

In particular, it is conceivable as well to provide an embodiment without permanent assignment of the unloading station, which allows a flexible number of operators to be assigned to each packing area. The adaptability to the individually different performance of individual operators is increased. The adaptability to the order profile, in particular to properties influencing the time required for packing such as order size and value added service, is improved.

Having been emptied in the unloading station 12, the carrying devices 7 are returned via a return track 35 of the overhead conveyor installation 1, are closed by means of a closing unit (not shown), in other words they are restored to their original condition, and are moved back to the loading station 6, for example, where they are available as empty bags again to be loaded with individual products 2.

At the packing station 14, the individual products 2 of an order 15 are compiled and packed. The packing station 14 is connected to an outgoing goods department 16 in a conveying manner via the outgoing goods department 16, the orders 15 comprising the individual products 2 are able to leave the installation 1. The orders 15 processed in the installation 1 may comprise various products and various numbers of products. It is conceivable as well for an order 15 to comprise only one single individual product 2. Orders 15 from the outgoing goods department 16 can be shipped using external transportation means 17 such as trucks.

Figure 3:
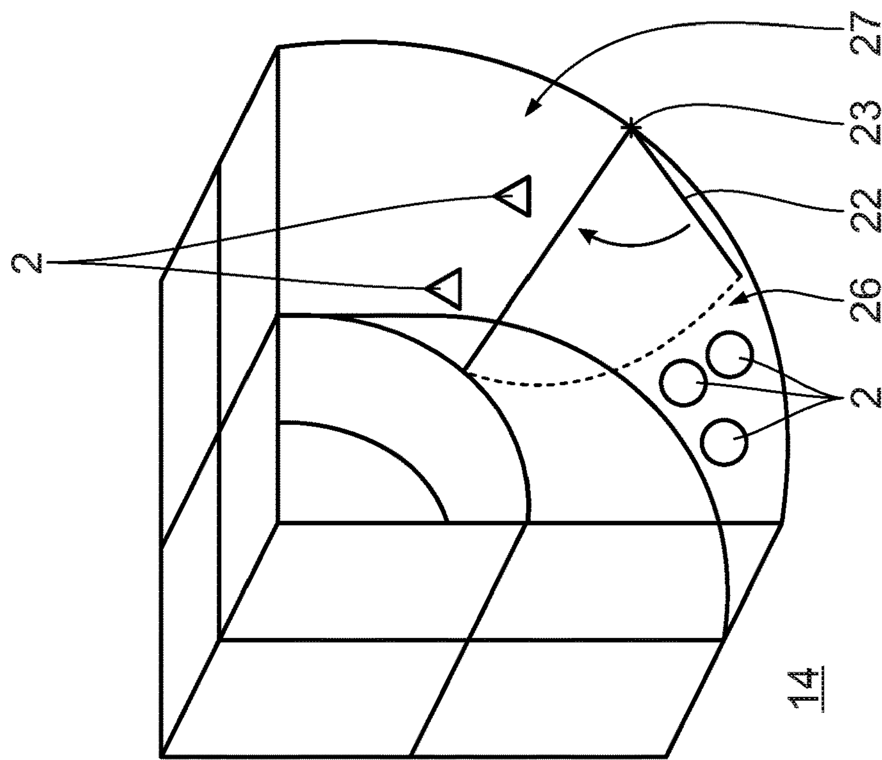
FIG. 3 shows an illustration, corresponding to FIG. 2, of the apparatus in a different working arrangement.

An apparatus according to a first exemplary embodiment will hereinafter be explained in more detail, taken in conjunction with FIGS. 2 and 3.

The apparatus 13 comprises four conveyor tracks 18. The conveyor tracks 18 are each configured essentially identically as 90° bends in the shape of a conveyor shaft. Each conveyor track 18 has a feed opening 19 arranged at the top and a discharge opening 20 shown in each case on the left of FIG. 2. At the respective feed opening, individual products 2 can be unloaded from the carrying device 7 and loaded into the apparatus 13. The respective discharge openings 20 of the conveyor tracks 18 are each connected to the associated feed opening 19 in a conveying manner. The individual products 2 fed to the apparatus 13 via the feed opening 19 are conveyed to the discharge opening 20. According to the exemplary embodiment shown, the individual products 2 are conveyed along the apparatus 13 automatically, in other words due to gravity. A conveying direction 21 is defined along the conveyor track 18 from the feed opening 19 towards the discharge opening 20.

Seen along the conveying direction 21, an actuable separating member 22 is in each case arranged between the feed opening 19 and the discharge opening 20. For the sake of clarity, only the separating member 22 for the conveyor track 18 is shown, which is shown on the bottom right of FIGS. 2 and 3 in each case. The other conveyor tracks 18 of the apparatus 13 have corresponding separating members 22. According to the exemplary embodiment shown, the separating member 22 is a pivotable flap, which is arranged in the open position in FIG. 2. The separating member 22 is articulated to the conveyor track 18 so as to be pivotable about a separating member pivot axis 23. The separating member 22 can be pivoted between the open position in FIG. 2 and the closed position in FIG. 3.

Figure 2:
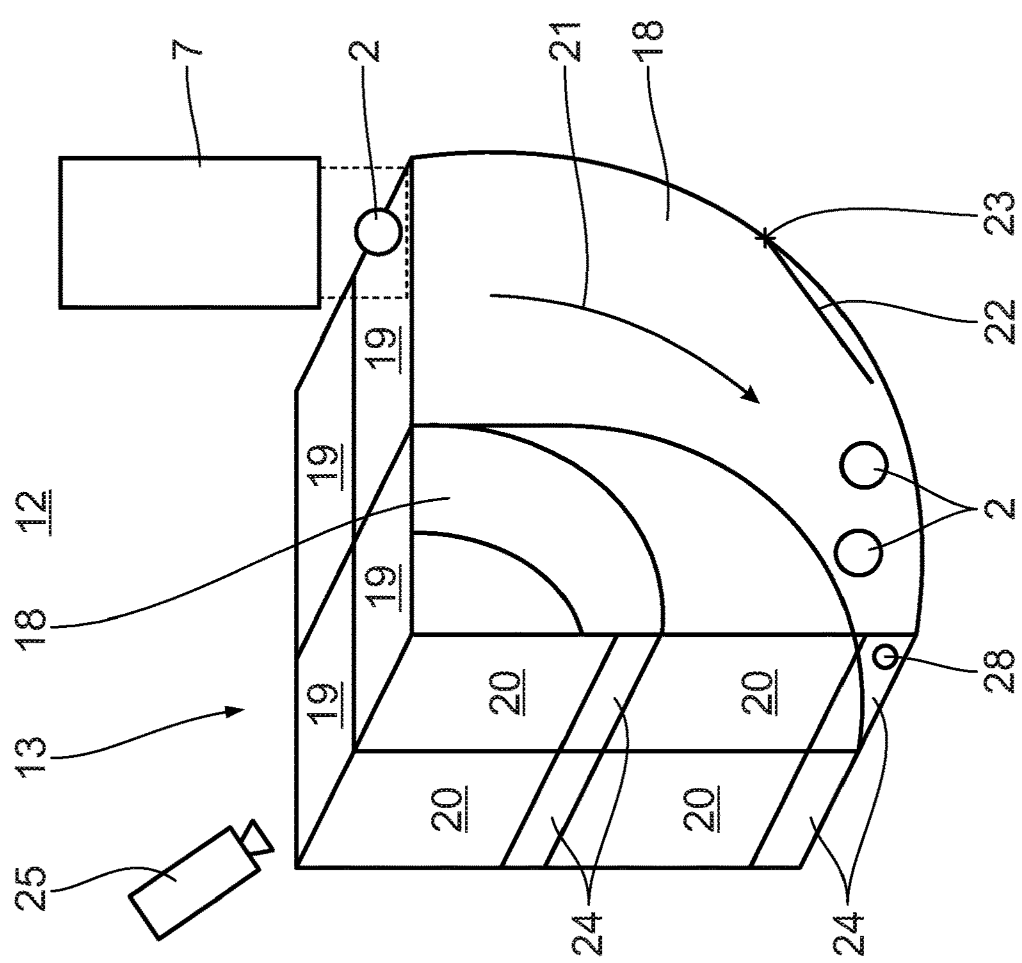
FIG. 2 shows a schematic illustration of an apparatus according to a first exemplary embodiment of an overhead conveyor installation.

As shown in FIG. 2, the conveyor tracks 18 are arranged in a matrix-like 2×2 grid. Correspondingly, the feed openings 19 and the discharge openings 20 are each arranged in a 2×2 grid, in other words in two rows and two columns. If a plurality of conveyor tracks 18 are provided, a random arrangement of the conveyor tracks 18 is conceivable, for example in a single row or in a random n×m grid. In the exemplary embodiment shown, the feed openings 19 are oriented horizontally, in other words in a horizontal plane. It is also conceivable for the feed openings 19 to be arranged at a feed inclination angle in relation to the horizontal plane, said feed inclination angle in particular amounting to at most 45°, in particular at most 30°, in particular at most 15°, and in particular at most 5°.

In the exemplary embodiment shown, the discharge openings 20 are oriented vertically, in other words in a vertical plane. The discharge openings can also be arranged at a discharge inclination angle in relation to the vertical plane, said discharge inclination angle amounting to at most 45°, in particular at most 30°, in particular at most 15°, and in particular at most 5°.

The discharge openings 20 are each provided with a stop member 24 configured as a retaining bar. The stop member 24 prevents the individual products 22 conveyed along the conveyor track 18 from inadvertently exiting the conveyor track 18. The stop members 24 ensure that the individual products 2 are provided at the discharge opening 20 in a defined manner. Instead of the retaining bars 24, a pivotable flap or a sliding flap configured to close the discharge opening 20 can be arranged at the discharge opening 20 additionally or alternatively.

It is also conceivable to provide a closure element at each of the feed openings 19 to prevent objects, in particular individual products 2, from inadvertently entering the respective conveyor track 18. The risk of order picking errors is thus prevented. A sensor 25 is shown in a purely schematic view in FIG. 2, said sensor being adapted to detect the individual products 2 loaded into the conveyor track 18. In particular, one sensor 25 is assigned to each conveyor track 18. In particular, the sensor 25 is in a signal connection with the central control unit 9. The sensor 25 is able to provide a control signal as soon as all individual products 2 of an order have been loaded into the conveyor track 18.

In the closed position of the separating member 22, individual products 2 are prevented from being conveyed to the discharge opening 20. The separating member 22 separates the conveyor track 18 into a discharge area 26 facing the discharge opening, and a parking area 27 arranged between the feed opening 19 and the separating member 22. In the discharge area 26, the individual products 2 are provided for discharge. In the parking area 27, individual products 2, in particular those of a following order 15, are parked. The separating member 22 prevents the individual products 2 of different orders 15 from getting mixed up in the apparatus 13.

According to the exemplary embodiment shown, the parking area 27 is integrated in the conveyor track.

According to the exemplary embodiment shown, a signal member 24 configured as an indicating member 28 in the manner of a signal lamp is provided in the region of the discharge opening 20. The indicating member 28 is used to indicate that the individual products 2 of a completed order 15 are available at the discharge opening 20. The indicating member 28 may additionally or alternatively be configured as an acoustic indicator configured as a signal tone. It is conceivable as well to use an indicating unit configured as a screen that indicates which of the discharge openings 20 must be operated next.

The functioning of the apparatus 13 will now be explained in more detail by means of FIGS. 2, 3. The carrying devices 7 with individual products 2 are conveyed along the overhead conveyor installation 1 to the unloading station 12 where they are opened automatically. The individual products 2 fall out of the carrying device 7 automatically due to gravity and are loaded into the feed opening 19 of a conveyor track 18. In the conveyor track 18, the individual products 2 are conveyed along the conveying direction 21 to the discharge opening 20 due to gravity where they are stopped by the stop member 24. The loading of the individual products 2 into the conveyor track 18 is monitored by means of the sensor 25. As soon as all individual products 2 of the order 15 have been loaded into the conveyor track 18, a control signal is transmitted from the control unit 9 to the separating member 22, causing the separating member 22 to move from the open position shown in FIG. 2 into the closed position shown in FIG. 3. The individual products 2 of the first order 15 are arranged in the parking area 26 where they are available at the packing station 14 for removal.

Further individual products 2 of a second order 15 can already be loaded into the conveyor track 18 even if the individual products 2 of the first order 15 available at the discharge opening 20 have not yet been removed at all or only partly. The individual products 2 of the second order 15 are parked in the parking area 27, in other words they are stored temporarily. As soon as the individual products 2 of the first order 15 at the packing station 14 have been removed and packed, the control unit 9 emits a release signal to the separating member 22, causing it to move back to the open position shown in FIG. 2, thus allowing the individual products 2 of the second order 15 to be conveyed to the discharge opening 20. For differentiation, the individual products 2 of the first order 15 are each symbolized by a circle while the individual products 2 of the second order 15 are each symbolized by a triangle.

The apparatus ensures an order-related provision of the individual products 2. According to the exemplary embodiment shown, the individual products 2 are unloaded at the unloading station 12 in an order-related manner and are fed to the apparatus 13. This means that all individual products 2 of the first order 15 are loaded into the apparatus 13 first before the following individual products 2 of the following order 15 are loaded into the apparatus 13.

In another embodiment not shown, the conveyor track 18 can also be configured as a spiral chute.

A second exemplary embodiment of an apparatus will hereinafter be described with reference to FIG. 4. Identically designed parts carry the same reference numerals as in the first exemplary embodiment to the description of which reference is made herewith. Differently designed parts having the same function carry the same reference numeral followed by an a.

The conveyor track 18*a* of the apparatus 13*a* has an essentially Y-shaped design with a feed opening 19 and two discharge openings 20. The conveyor track 18*a* has a switch area 29. The separating member 22*a* is arranged in the switch area 29. The separating member 22*a* is configured as a switch blade, which is arranged in such a way as to be pivotable about the pivot axis 23*a* between two end positions. In the arrangement of the separating member 22*a* shown in FIG. 4, the individual products 2 are conveyed to the discharge opening 20 shown on the left in the left-hand branch of the conveyor track 18*a*. In the other arrangement of the separating member 22*a* indicated by dashed lines in FIG. 4, the individual products 2 are conveyed to the discharge opening 20 shown on the right in the right-hand branch of the conveyor track 18*a*. In the arrangement shown in FIG. 4, the right-hand branch of the conveyor track 18*a* is the parking area 27*a*, which is separated by the separating member 22*a* from the feed opening 19. The branch of the conveyor track 18*a* released by the separating member 22*a* forms the discharge area 26*a*.

Figure 4:
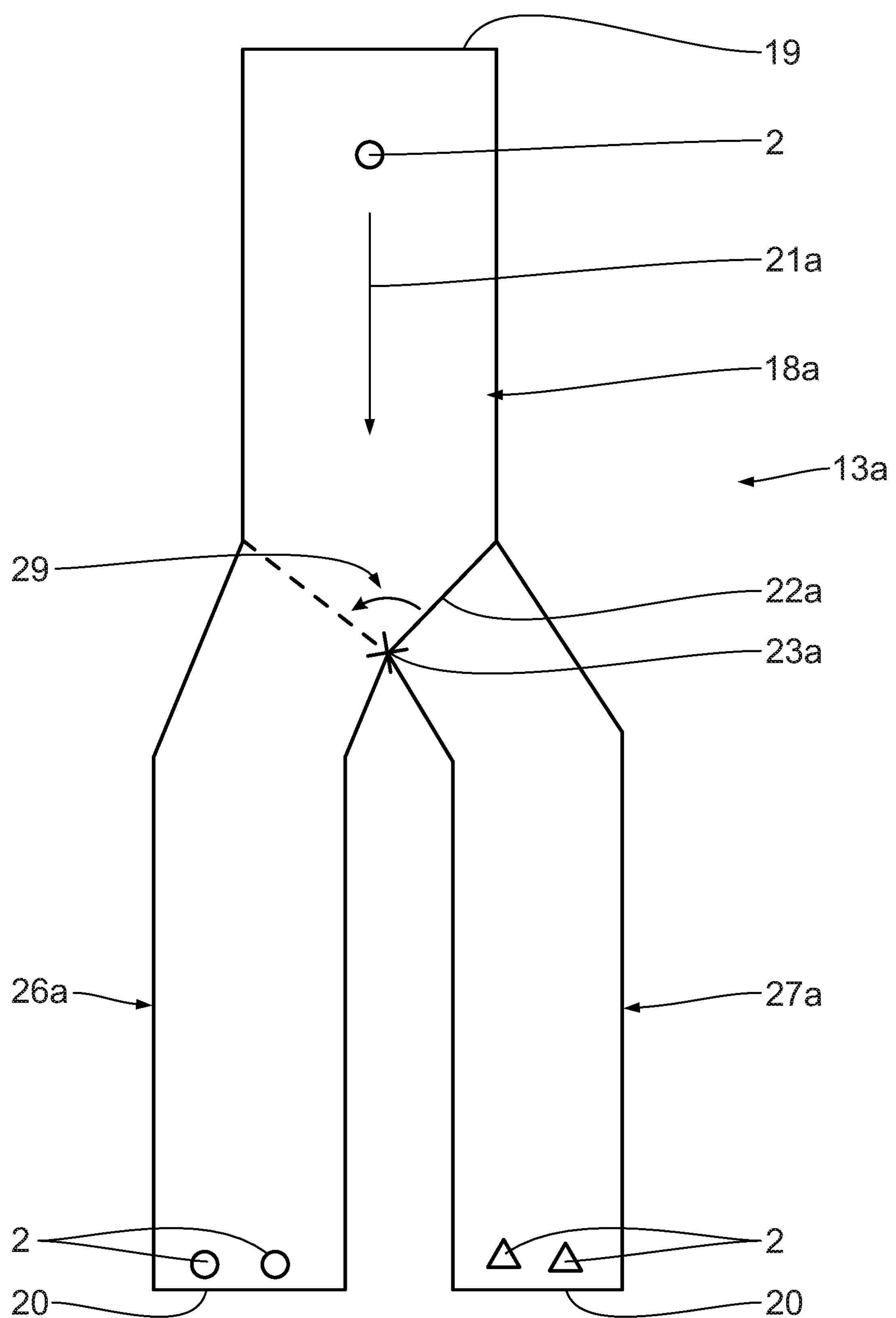
FIG. 4 shows an illustration of an apparatus according to a second exemplary embodiment.

The apparatus 13 as shown in FIG. 4 can be arranged such that the conveying direction 21 is essentially vertical, in other words both the feed opening 19 and the discharge openings 20 are each arranged in a horizontal plane. Alternatively, it is also conveivable for the conveying direction 21*a* to be oriented horizontally. Correspondingly, the feed opening 19 and the discharge openings 20 are oriented in a vertical plane. In this case, the conveyor track can be configured as a driven conveyor belt, for example, on which the individual products 2 are placed for transport by means of the conveyor belt.

A third exemplary embodiment of the invention will hereinafter be described with reference to FIG. 4. Identically designed parts carry the same reference numerals as in the first exemplary embodiment to the description of which reference is made herewith. Differently designed parts having the same function carry the same reference numeral followed by a b.

The most essential difference compared to the first exemplary embodiment is that each apparatus 13*b* comprises two conveyor tracks 18*b*, with the individual products 2 of different orders 15 being loaded into the first conveyor track or into the second conveyor track 18*b*, respectively. Therefore, the conveyor track 18*b* into which the individual products 2 are being loaded forms the discharge area 28*a* while the conveyor track 18*b* in which the individual products 2 to be discharged at a later point in time are being stored temporarily, in other words are being parked, forms the parking area 27*b*. A separating member can be omitted in this exemplary embodiment. At the unloading station 12, an overhead conveyor system is provided, the overhead conveyor system comprising a rail system 11 along which transport bags 7 are conveyed, which are suspended from roll adapters 30. The unloading station 12 is arranged such that the transport bags 7 are guided along the conveyor tracks 18*b* above the feed openings 19. The automatic opening of the transport bags 7 allows the individual products 2 to fall into the feed openings 19 provided for this purpose. The individual products 2 are unloaded from the transport bags 7 in particular during the transport of the transport bags 7. It is in particular not provided for the transport bags 7 to be stopped for unloading the individual products 2. The apparatus 13*b* is also referred to as packing wall.

Figure 5:
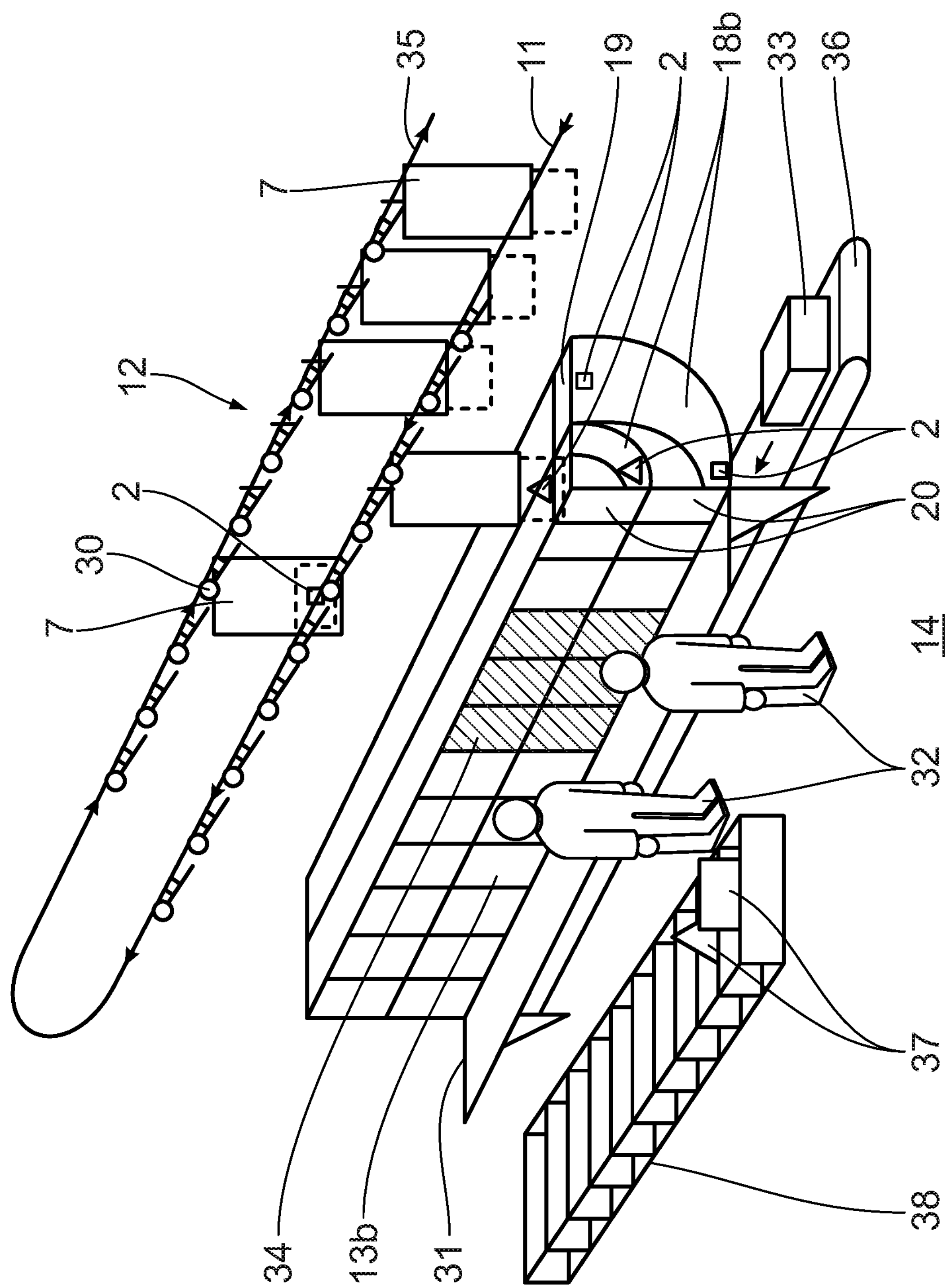
FIG. 5 shows a sectional view of an overhead conveyor installation comprising an apparatus according to a third exemplary embodiment.

The packing wall is usually operated by several operators 32, with each operator 32 having an assigned workplace 34. For each operator 32, the workplace 34 is defined in particular by a fixed assignment of discharge openings 20. A typical workplace 34 may comprise six discharge openings 20, for example, which are shown by hatched lines in FIG. 5.

It is also conceivable for the respective workplace to be defined flexibly. A flexible definition of the respective workplace is in particular possible in order to take into account the individual packing performance of the operator 32 and/or other distinctive criteria, which depend in particular on the respective individual product. Criteria of this type include for example the product value, the package delivery service, the order size and/or the shipping container.

The respective conveyor tracks 18*b* form so-called destinations. By loading the individual products 2 into the conveyor tracks 18*b* in a targeted manner, a so-called destination sorting can be carried out. It is in particular not necessary to transport the individual products 2 to the apparatuses 13*b* in an order-related manner. The individual products 2 can be transported to the unloading station 12 in an in particular entirely unsorted manner.

The apparatus 13*b* has a plurality of conveyor tracks 18*b*, which are arranged in two rows in such a way that in each case two discharge openings 20 are arranged on top of one another. In the region of the discharge openings 20, a packing table 31 is provided at the packing station which makes it easier for operators 32 to pack the individual products 2 removed from the discharge openings into a shipping container 33 configured as a shipping box.

Having been unloaded, the empty transport bags 7 are returned via the return track 35. The ready packed shipping container 33 can be transported, by means of a transport infrastructure 36, to the outgoing goods department 16. Instead of the transport infrastructure 36, which is configured as an automatic conveyor belt, a manual transportation to the outgoing goods department 16 can be provided for as well.

In the apparatus 13*b*, the individual products 2 are collected in the conveyor tracks 18*b*, which serve as destinations. The destination is stationary. Conveyor chutes and/or spiral chutes can be used to ensure a reliable feeding of the individual products 2 from the transport bags 7 into the conveyor tracks 18*b*.

As soon as all individual products 2 of an order 15 are available in a conveyor track 18*b* or—in the case of split orders—a partial order is available, this is indicated to the operator 32 using the indicating member 28. An order can be split because of the total volume of the order, in other words the number of individual parts and/or because of other criteria such as the fragility of an individual product. Splitting the individual products 15 of an order among a plurality of conveyor tracks 18*b*, in other words destinations, is advantageous to prevent damages to the individual parts. In particular the accumulation pressure along a conveyor track is reduced. The operator 32 can remove the individual products 2 of the order 15 at the discharge opening 20 and pack them at the packing table 31 to form a ready-packed order 15. The conveyor tracks 18*b* of the packing wall can additionally be equipped with a separating member as explained for the first exemplary embodiment.

Additionally, individual products 37 not suitable for transport in a transport bag can be provided at the packing station 14 using an additional infrastructure 38. This expands the functionality of the overhead conveyor installation 1 as it is possible for the orders 15 to also comprise individual products 37 not suitable for transport in a transport bag.

The essential advantages of the apparatus according to the invention consist in that the expenditures for the overhead conveyor system of the overhead conveyor installation 1 are reduced. The space requirement at the packing station 14 is reduced. The provision of individual products 37, which are not suitable for transport in a transport bag, is simplified because of the reduced space requirement. It is in particular conceivable for the individual products 37, which are not suitable for transport in a transport bag, to be provided in a separate apparatus designed for this purpose. The sequences of the two material flows of individual products 37, which are suitable and not suitable for transport in a transport bag, need not be synchronized with one another. The products can be provided at the packing station 14 in a flexible and independent manner.

The result is a flexible configuration of the number of operators 32. The result is a flexible configuration of the workplaces 34 at the apparatus 13*b*.

The height requirement at the packing station 14 is reduced. Owing to the fact that the overhead conveyor system can have a very compact design in the region of the packing station 14, its connection to other transport infrastructures, in particular the transport infrastructure 36 for the removal of ready-packed orders 15 and the additional infrastructure 38 for the provision of individual products 37, which are not suitable for transport in a transport bag, are simplified.

The result is a flexible configuration in terms of the number of packing stations 14.

The conveyor capacity of the overhead conveyor system can be used optimally. The apparatus according to the invention is suitable for unloading more than 250 individual products 2 per hour, in particular more than 500, in particular more than 1000, in particular more than 2000, in particular more than 2500, and in particular more than 3000 carrying devices 7 per hour in the unloading area 12 and to provide the individual products 2 at the discharge openings 20 in order to be packed into orders 15 by the operators 32.

The accessibility of the packaging material at the packing station 14 can be improved. The apparatus 13*b* can be combined with other technologies, in particular for packing the individual products, in particular pick-by-light, pick-by-voice, and pick-by-vision.

What is claimed is:

1. An overhead conveyor installation comprising:

a. a conveyor system for conveying the individual products in a suspended manner;

b. an unloading station unloading the individual products;

c. a conveyor track with i. a feed opening for feeding the individual products unloaded at the unloading station;

ii. a discharge opening connected to said feed opening in a conveying manner, the discharge opening being configured to provide individual products of a first order at a packing station, wherein the discharge opening is arranged at the packing station;

d. a parking area for parking individual products of a second order at the packing station;

e. the packing station being configured for packing the individual products in an order-related manner by means of the apparatus, the packing station being configured to buffer, compile and pack the individual products into their respective orders for shipping, the packing station being configured to have operators pack the individual products into respective shipping containers.

2. The overhead conveyor installation as claimed in claim 1, wherein the parking area is arranged in a second conveyor track, which is provided with a second feed opening for feeding the individual products of the second order and with a second discharge opening connected to the second feed opening in a conveying manner, for providing the individual products of the second order at the packing station.

3. The overhead conveyor installation as claimed in claim 1, further comprising a signal member to indicate that the individual products of a complete order are available at the discharge opening.

4. The overhead conveyor installation as claimed in claim 1, wherein a separating member is arranged along the conveyor track to separate the individual products of various orders.

5. The overhead conveyor installation as claimed in claim 1, comprising a plurality of conveyor tracks.

6. The overhead conveyor installation as claimed in claim 1, wherein each conveyor track has one feed opening and one discharge opening, with at least one of the group comprising the feed openings and the discharge openings being arranged in the manner of a matrix.

7. The overhead conveyor installation as claimed in claim 1, wherein said at least one of the group comprising the feed openings and the discharge openings are arranged in rows and columns.

8. The overhead conveyor installation as claimed in claim 1, wherein a stop member is arranged at the discharge opening to stop the feeding of the individual products.

9. The overhead conveyor installation as claimed in claim 1, wherein the feed opening is arranged at a feed inclination angle of at most 45° in relation to a horizontal plane.

10. The overhead conveyor installation as claimed in claim 1, wherein the feed opening is oriented horizontally.

11. The overhead conveyor installation as claimed in claim 1, wherein the discharge opening is arranged at a discharge inclination angle of at most 45° in relation to a vertical plane.

12. The overhead conveyor installation as claimed in claim 1, wherein the discharge opening is oriented vertically.

13. The overhead conveyor installation as claimed in claim 1, wherein the conveyor track is inclined in relation to the horizontal at least partly.

14. The overhead conveyor installation as claimed in claim 1, comprising a sensor to detect the individual products loaded into the conveyor track.

* * * * *